(12) United States Patent
Farre Guiu et al.

(10) Patent No.: US 11,064,268 B2
(45) Date of Patent: Jul. 13, 2021

(54) MEDIA CONTENT METADATA MAPPING

(71) Applicant: Disney Enterprises, Inc., Burbank, CA (US)

(72) Inventors: Miquel Angel Farre Guiu, Bern (CH); Matthew C. Petrillo, Sandy Hook, CT (US); Monica Alfaro Vendrell, Barcelona (ES); Marc Junyent Martin, Barcelona (ES); Katharine S. Ettinger, Santa Monica, CA (US); Evan A. Binder, Calabasas, CA (US); Anthony M. Accardo, Los Angeles, CA (US); Avner Swerdlow, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/934,871

(22) Filed: Mar. 23, 2018

(65) Prior Publication Data

US 2019/0297392 A1 Sep. 26, 2019

(51) Int. Cl.
| | |
|---|---|
| *G06K 9/00* | (2006.01) |
| *H04N 21/84* | (2011.01) |
| *H04N 21/845* | (2011.01) |
| *G06F 16/783* | (2019.01) |

(52) U.S. Cl.
CPC ..... *H04N 21/8402* (2013.01); *G06F 16/7834* (2019.01); *G06K 9/00758* (2013.01); *H04N 21/845* (2013.01)

(58) Field of Classification Search
CPC ......... G11B 27/00; G06F 17/00; G06F 16/00; G06F 3/04; G06F 16/7834; G06F 16/783; G06F 40/00; H04N 21/8402; H04N 21/845; H04N 21/8405; H04N 21/8541; H04N 21/458; G06T 2207/00; G06K 9/00758

See application file for complete search history.

(56) References Cited

U.S. PATENT DOCUMENTS

| | | | | |
|---|---|---|---|---|
| 9,275,682 | B1 * | 3/2016 | Yalniz ................. | G11B 27/036 |
| 2008/0044155 | A1 * | 2/2008 | Kuspa ................. | G11B 27/034 |
| | | | | 386/278 |
| 2010/0281375 | A1 * | 11/2010 | Pendergast .......... | G11B 27/034 |
| | | | | 715/723 |
| 2011/0222787 | A1 * | 9/2011 | Thiemert ........... | G06K 9/00758 |
| | | | | 382/225 |

(Continued)

*Primary Examiner* — Sanchita Roy
(74) *Attorney, Agent, or Firm* — Farjami & Farjami LLP (57) ABSTRACT

According to one implementation, a media content annotation system includes a computing platform having a hardware processor and a system memory storing a software code. The hardware processor executes the software code to receive a first version of media content and a second version of the media content altered with respect to the first version, and to map each of multiple segments of the first version of the media content to a corresponding one segment of the second version of the media content. The software code further aligns each of the segments of the first version of the media content with its corresponding one segment of the second version of the media content, and utilizes metadata associated with each of at least some of the segments of the first version of the media content to annotate its corresponding one segment of the second version of the media content.

18 Claims, 4 Drawing Sheets

(56) References Cited

U.S. PATENT DOCUMENTS

| | | | | |
|---|---|---|---|---|
| 2013/0121668 A1* | 5/2013 | Meaney | ............... | G11B 27/034 |
| | | | | 386/282 |
| 2013/0124998 A1* | 5/2013 | Pendergast | ........... | G11B 27/031 |
| | | | | 715/723 |
| 2015/0296228 A1* | 10/2015 | Chen | ....................... | G06F 16/78 |
| | | | | 725/34 |
| 2015/0304705 A1* | 10/2015 | Duong | ............. | H04N 21/23439 |
| | | | | 386/241 |
| 2015/0332096 A1* | 11/2015 | Wang | ...................... | H04N 5/04 |
| | | | | 348/513 |

* cited by examiner

MEDIA CONTENT METADATA MAPPING

BACKGROUND

Media content, such as movie or television (TV) content for example, is often produced in multiple versions that, while including much of the same core content, may differ in resolution, through the deletion of some original content, or through the addition of advertising or ancillary content. One example of such versioning is a censored version of a movie in which some scenes from the original master version of the movie are removed. Another example of such versioning is a broadcast version of TV programming content in which the content included in the original master version of the TV content is supplemented with advertising content.

Despite the evident advantages of versioning media content to accommodate the tastes and sensibilities of a target audience, or the requirements of advertisers sponsoring distribution of the media content, the consistent annotation of media content across its multiple versions has presented significant challenges. Those challenges arise due to the change in temporal location of a particular segment of the media content from one version to another. In the conventional art, the process of mapping metadata from a master version of media content to other versions of that content is a manual process the may require hours of work by a human editor.

SUMMARY

There are provided systems and methods for performing media content metadata mapping, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a media content annotation solution that overcomes the drawbacks and deficiencies in the conventional art. An example solution does so by mapping each of multiple segments of a first version of media content to a corresponding one segment of a second version of the media content. Those segments may take the form of a video frame, or a shot of video, for example. It is noted that, as used in the present application, a shot of video is a sequence of video frames that is captured from a unique camera perspective without cuts and/or other cinematic transitions.

Mapping segments between the first and second versions of the media content enables alignment of each video segment in the first version with its corresponding segment in the second version. As a result, metadata associated with a segment of the first version of the media content may be used to annotate its corresponding segment of the second version of the media content, and vice versa, thereby providing an accurate and efficient solution for mapping metadata annotations among versions of the same core media content. Moreover, the present solution further advantageously enables performance of the disclosed media content metadata mapping as an automated process.

It is noted that, as used in the present application, the terms "automation," "automated", and "automating" refer to systems and processes that do not require the participation of a human user, such as a human editor or annotator. Although, in some implementations, a human editor or annotator may confirm or correct a metadata annotation mapped by the automated systems and according to the automated methods described herein, that human involvement is optional. Thus, the methods described in the present application may be performed under the control of hardware processing components of the disclosed systems.

Figure 1:
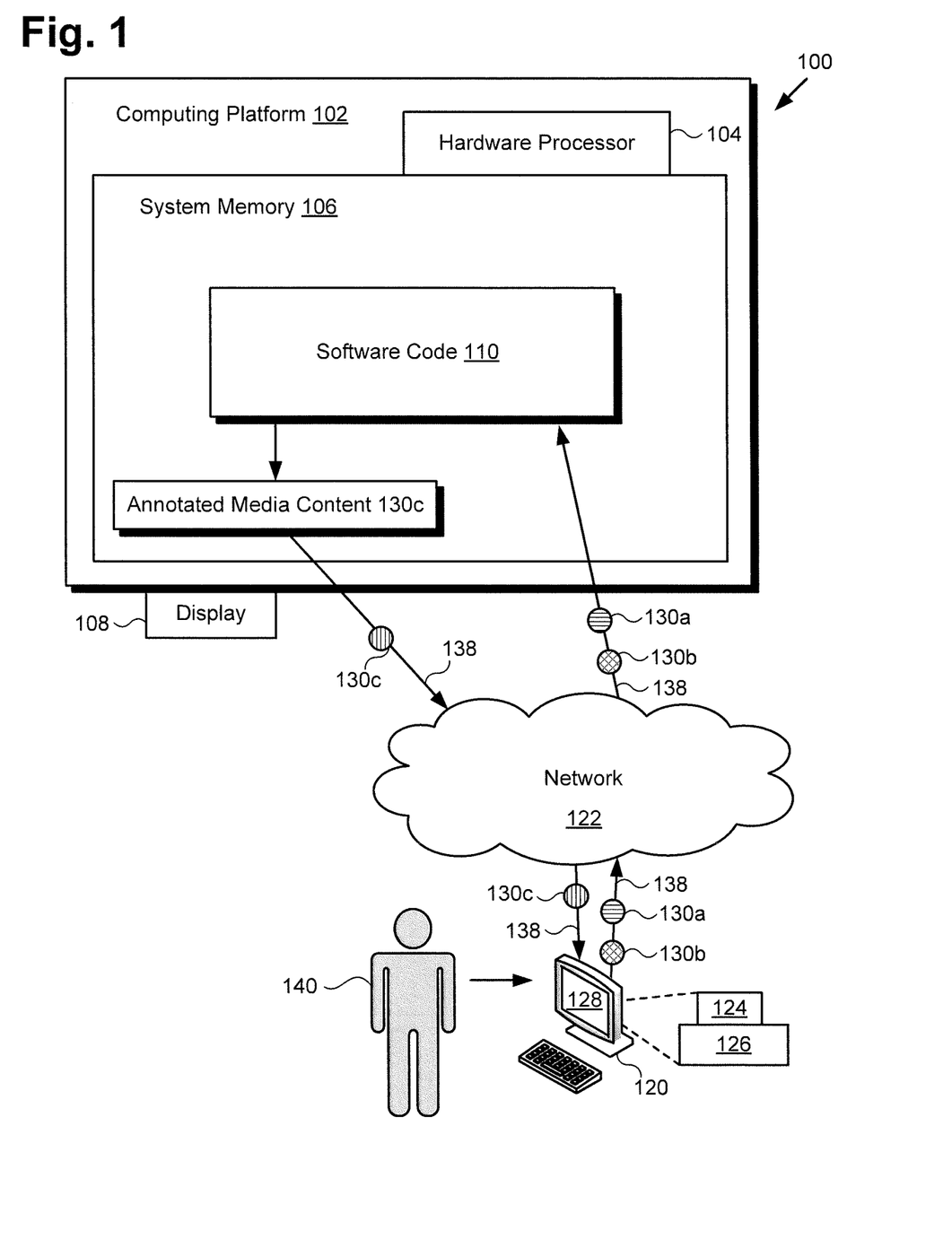
FIG. 1 shows a diagram of an exemplary system for performing media content metadata mapping, according to one implementation.

FIG. 1 shows a diagram of an exemplary system for performing media content metadata mapping, according to one implementation. As shown in FIG. 1, media content annotation system 100 includes computing platform 102 having hardware processor 104, system memory 106 implemented as a non-transitory storage device, and display 108. According to the present exemplary implementation, system memory 106 stores software code 110.

As further shown in FIG. 1, media content annotation system 100 is implemented within a use environment including communication network 122, user system 120 including user system hardware processor 124, user system memory 126, and display 128, as well as user 140 utilizing user system 120. Also shown in FIG. 1 are network communication links 138 interactively connecting user system 120 and media content annotation system 100 via communication network 122, media content first version 130a, media content second version 130b, and annotated media content 130c that has been annotated using software code 110.

It is noted that display 108, as well as display 128 of user system 120, may be implemented as a liquid crystal display (LCD), a light-emitting diode (LED) display, an organic light-emitting diode (OLED) display, or another suitable display screen that performs a physical transformation of signals to light. It is further noted that, although the present application refers to software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts software code 110 as being stored in its entirety in system memory 106, that representation is also provided merely as an aid to conceptual clarity. More generally, media content annotation system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within media content annotation system 100. Thus, it is to be understood that various features of software code 110, such as one or more of the features described below by reference to FIG. 2, may be stored and/or executed using the distributed memory and/or processor resources of media content annotation system 100.

According to the implementation shown by FIG. 1, user 140 may utilize user system 120 to interact with media content annotation system 100 over communication network 122. In one such implementation, media content annotation system 100 may correspond to one or more web servers, accessible over a packet-switched network such as the Internet, for example. Alternatively, media content annotation system 100 may correspond to one or more computer servers supporting a local area network (LAN), or included in another type of limited distribution network.

Although user system 120 is shown as a desktop computer in FIG. 1, that representation is also provided merely as an example. More generally, user system 120 may be any suitable mobile or stationary computing device or system that implements data processing capabilities sufficient to provide a user interface, support connections to communication network 122, and implement the functionality ascribed to user system 120 herein. For example, in other implementations, user system 120 may take the form of a laptop computer, tablet computer, or smartphone, for example. User 140 may utilize user system 120 to interact with media content annotation system 100 to use software code 110, executed by hardware processor 104, to produce annotated media content 130c based on media content first version 130a and media content second version 130b.

It is noted that, in various implementations, annotated media content 130c, when generated using software code 110, may be stored in system memory 106 and/or may be copied to non-volatile storage. Alternatively, or in addition, as shown in FIG. 1, in some implementations, annotated media content 130c may be sent to user system 120 including display 128, for example by being transferred via network communication links 138 of communication network 122.

In some implementations, software code 110 may be utilized directly by user system 120. For example, software code 110 may be transferred to user system memory 126, via download over communication system 122, for example, or via transfer using a computer-readable non-transitory medium, such as an optical disc or FLASH drive. In those implementations, software code 110 may be persistently stored on user system memory 126, and may be executed locally on user system 120 by user system hardware processor 124.

Figure 2:
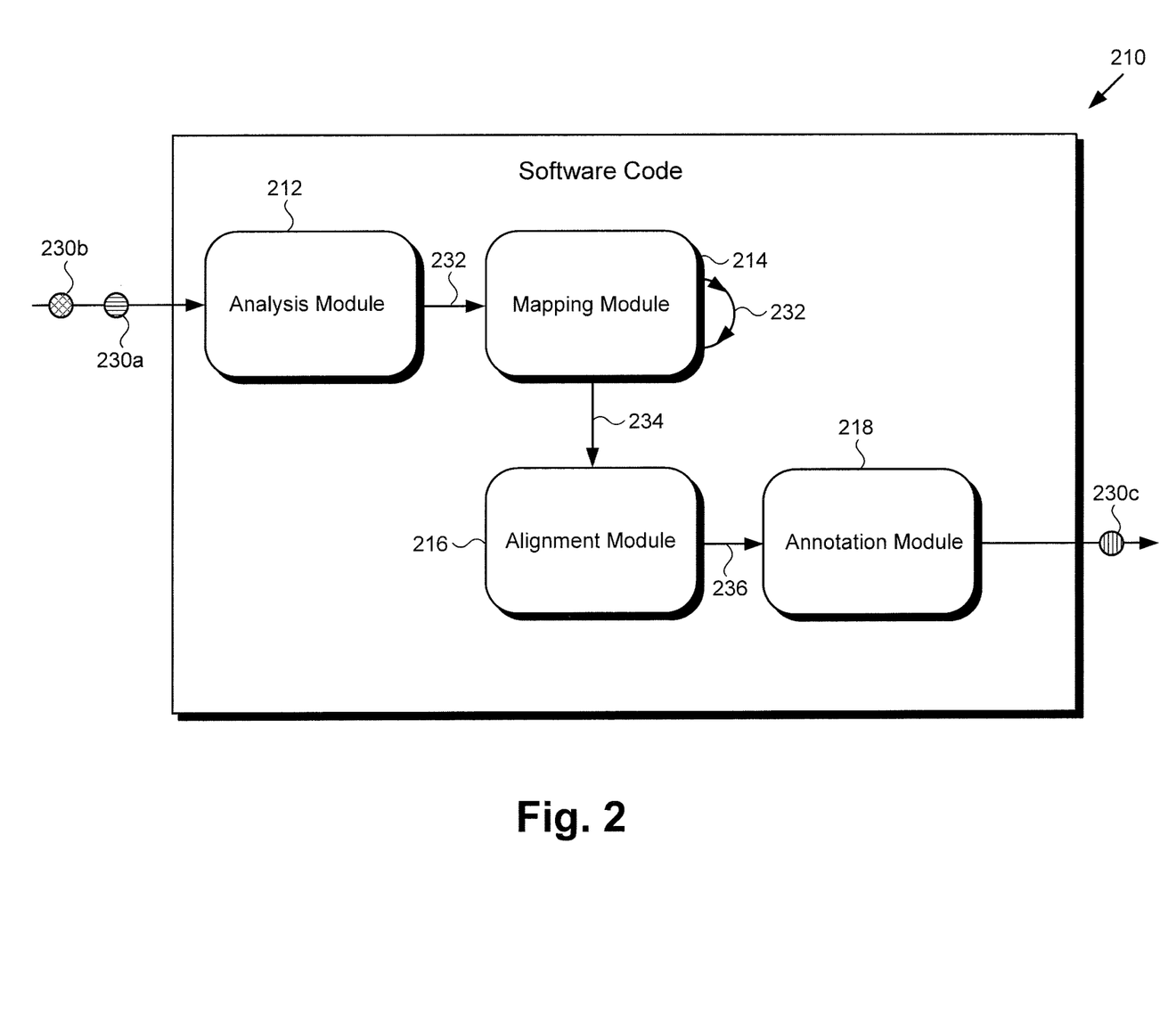
FIG. 2 shows an exemplary diagram of a software code suitable for execution by a hardware processor of the system shown by FIG. 1, according to one implementation.

FIG. 2 shows exemplary software code 210 suitable for execution by hardware processor 104 of computing platform 102 or by user system hardware processor 124 of user system 120, in FIG. 1, according to one implementation. As shown in FIG. 2, software code 210 may include analysis module 212, mapping module 214, alignment module 216, and annotation module 218. Also shown in FIG. 2 are comparison data 232, mapping data 234, and alignment data 236, as well as media content first version 230a, media content second version 230b, and annotated media content 230c.

Media content first version 230a, media content second version 230b, and annotated media content 230c correspond respectively in general to media content first version 130a, media content second version 130b, and annotated media content 130c, in FIG. 1, and those corresponding features may share any of the characteristics attributed to either corresponding feature by the present disclosure. In addition, software code 210 corresponds in general to software code 110, and those corresponding features may share the characteristics attributed to either corresponding feature by the present disclosure. That is to say, like software code 210, software code 110 may include features corresponding respectively to analysis module 212, mapping module 214, alignment module 216, and annotation module 218.

Figure 3:
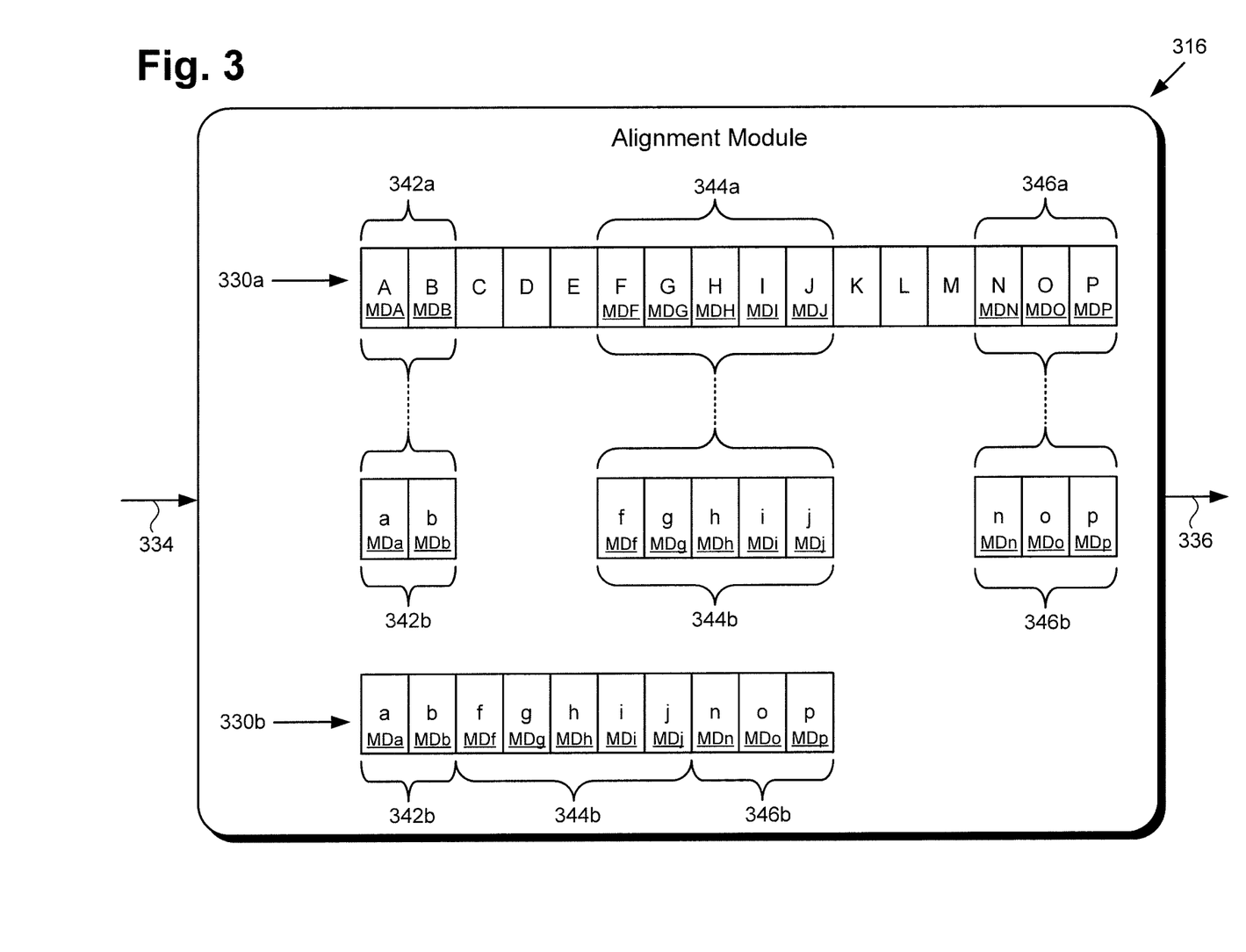
FIG. 3 shows an exemplary media content alignment module of the software code of FIG. 2, according to one implementation.

FIG. 3 shows exemplary alignment module 316 of software code 110/210, according to one implementation. It is noted that alignment module 316, in FIG. 3, is a specific exemplary implementation of alignment module 216, in FIG. 2, and corresponds in general to alignment module 216. Consequently, alignment module 316 and alignment module 216 can share any of the features attributed to either corresponding feature by the present disclosure.

FIG. 3 also shows mapping data 334, alignment data 336, and media content first version 330a including segments 342a, 344a, and 346a, as well as media content second version 330b including segments 342b, 344b, and 346b. Mapping data 334 and alignment data 336 correspond respectively in general to mapping data 234 and alignment data 236, in FIG. 2, and those corresponding features may share any of the characteristics attributed to either corresponding feature by the present disclosure. Moreover, media content first version 330a and media content second version 330b correspond respectively in general to media content first version 130a/230a and media content second version 130b/230b, in FIG. 1/2, and those corresponding features may share the characteristics attributed to any of the corresponding features by the present disclosure.

It is noted that, in the interests of conceptual clarity, media content first version 130a/230a/330a and media content second version 130b/230b/330b will be described as video sequences including multiple video frames. For example, and as shown in FIG. 3, media content second version 130b/230b/330b may include video frames a, b, f, g, h, i, j, n, o, and p. It is emphasized that although media content first version 130a/230a/330a and media content second version 130b/230b/330b correspond to the same core media content, they may not include the same number of video frames. For instance, and as further shown in FIG. 3, media content first version 130a/230a/330a may include video frames A, B, F, G, H, I, G, J, N, O, and P corresponding respectively to video frames "a", "b", "f", "g", "h", "i", "j", "n", "o", and "p" of media content second version 130b/230b/330b. However, in addition, media content first version 130a/230a/330a may include video frames omitted from media content second version 130*b*/230*b*/330*b*, such as video frames C, D, E, K, L, and M.

According to the exemplary implementation shown in FIG. 3, at least some of the video frames of media content first version 130*a*/230*a*/330*a* have metadata associated with them. For instance, metadata MDA is associated with video frame A of media content first version 130*a*/230*a*/330*a*, metadata MDB is associated with video frame B, metadata MDF is associated with video frame F, and so forth. As shown in FIG. 3, in some implementations, some or all of the video frames of media content second version 130*b*/230*b*/330*b* may analogously have metadata associated with them. Again by way of example, metadata MDa is associated with video frame "a" of media content second version 130*a*/230*a*/330*a*, metadata MDb is associated with frame "b", metadata MDf is associated with frame "f", and so forth.

Figure 4:
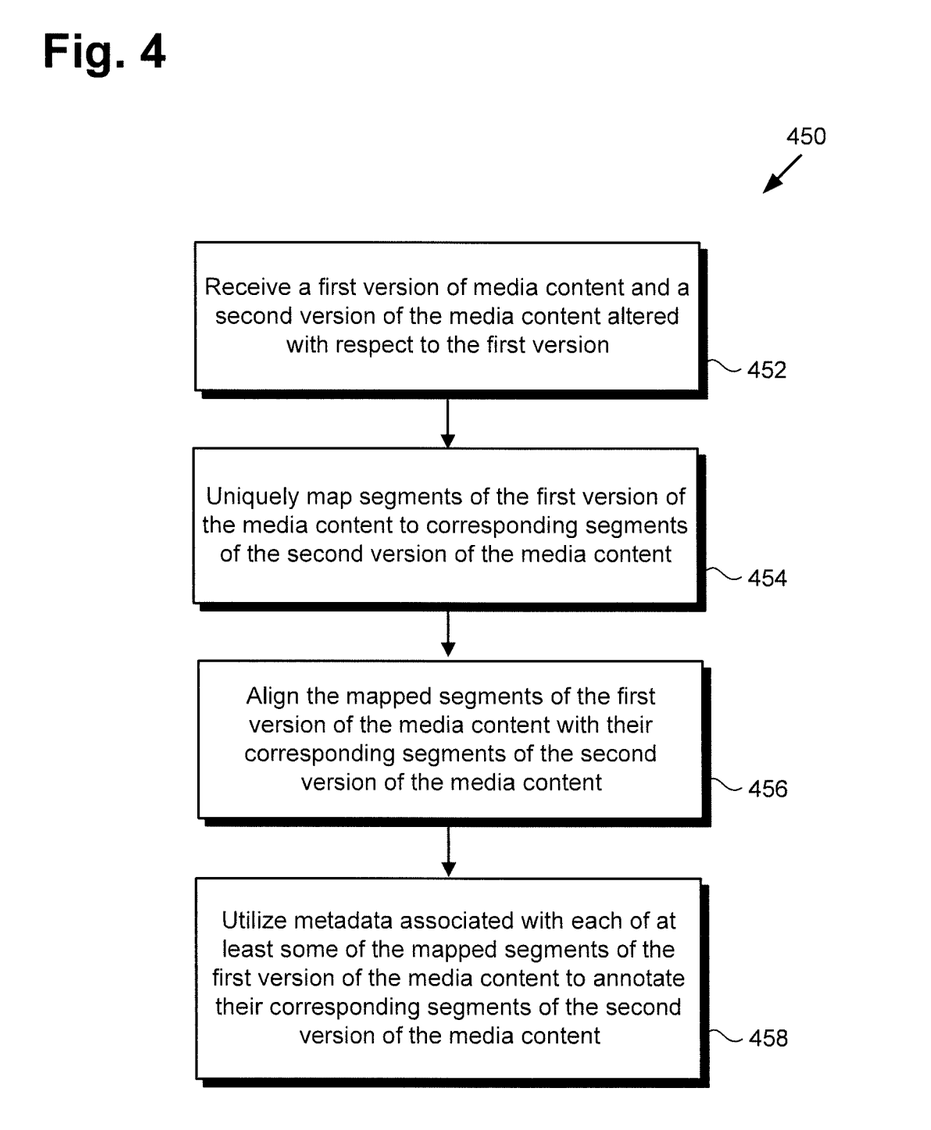
FIG. 4 shows a flowchart presenting an exemplary method for performing media content metadata mapping, according to one implementation.

The functionality of software code 110/210 will be further described by reference to FIG. 4 in combination with FIGS. 1, 2, and 3. FIG. 4 shows flowchart 450 presenting an exemplary method for performing media content metadata mapping, according to one implementation. With respect to the method outlined in FIG. 4, it is noted that certain details and features have been left out of flowchart 450 in order not to obscure the discussion of the inventive features in the present application.

Referring now to FIG. 4 in combination with FIGS. 1, 2, and 3, flowchart 450 begins with receiving media content first version 130*a*/230*a*/330*a* and media content second version 130*b*/230*b*/330*b* altered with respect to media content first version 130*a*/230*a*/330*a* (action 452). Media content second version 130*b*/230*b*/330*b* may be altered with respect to media content first version 130*a*/230*a*/330*a* in a number of ways. For example, media content first version 130*a*/230*a*/330*a* may be an original master version of a movie or television (TV) program, while media content second version 130*b*/230*b*/330*b* may be a censored version of the movie or TV program in which some scenes from the original master version are removed. As another example, media content second version 130*b*/230*b*/330*b* may be a broadcast version of TV programming content in which the content included in the original master version of the TV content, i.e., media content first version 130*a*/230*a*/330*a*, is supplemented with advertising content.

In some implementations, user 140 may utilize user system 120 to interact with media content annotation system 100 in order to produce annotated media content 130*c*/230*c*/330*c*. As shown by FIG. 1, in one implementation, user 140 may do so by transmitting one or both of media content first version 130*a*/230*a*/330*a* and media content second version 130*b*/230*b*/330*b* from user system 120 to media content annotation system 100 via communication network 122 and network communication links 138. Alternatively, one or both of media content first version 130*a*/230*a*/330*a* and media content second version 130*b*/230*b*/330*b* may be received from a third party source, or may be stored in system memory 106.

As yet another alternative, and as noted above, in some implementations, software code 110/210 may be utilized directly by user system 120. In those implementations, one or both of media content first version 130*a*/230*a*/330*a* and media content second version 130*b*/230*b*/330*b* may be received from a third party source, or may be stored in user system memory 126. Media content first version 130*a*/230*a*/330*a* and media content second version 130*b*/230*b*/330*b* may be received by analysis module 212 of software code 110/210, executed by hardware processor 104 of computing platform 102, or by user system hardware processor 124 of user system 120.

Flowchart 450 continues with mapping each of segments 342*a*, 344*a*, and 346*a* of media content first version 130*a*/230*a*/330*a* to a corresponding one segment of media content second version 130*b*/230*b*/330*b*, i.e., respective segments 342*b*, 344*b*, and 346*b* (action 454). In some implementations in which media content first version 130*a*/230*a*/330*a* and media content second version 130*b*/230*b*/330*b* are video sequences, each of segments 342*a*, 344*a*, 346*a*, 342*b*, 344*b*, and 346*b* may be a shot of video, for example, as defined above. However, in other implementations in which media content first version 130*a*/230*a*/330*a* and media content second version 130*b*/230*b*/330*b* are video sequences, each of segments 342*a*, 344*a*, 346*a*, 342*b*, 344*b*, and 346*b* may include no more than a single video frame, i.e., one of video frames A through P or "a", "b", "f", "g", "h", "i", "j", "n", "o", or "p".

For exemplary purposes, the mapping performed in action 454 will be described for use cases in which each of segments 342*a*, 344*a*, 346*a*, 342*b*, 344*b*, and 346*b* includes multiple video frames. The mapping of action 454 can be performed by mapping module 214 of software code 120/220, executed by hardware processor 104 of computing platform 102, or by user system hardware processor 124 of user system 120, and based on comparison data 232 produced by analysis module 212.

With respect to comparison data 232, it is noted that each of segments 342*a*, 344*a*, 346*a*, 342*b*, 344*b*, and 346*b* can be represented by a set of visual features extracted from the video frames it contains. Alternatively, or in addition, segments 342*a*, 344*a*, 346*a*, 342*b*, 344*b*, and 346*b* can be represented by its audio characteristics and/or its duration in time. Thus, each of segments 342*a*, 344*a*, and 346*a* of media content first version 130*a*/230*a*/330*a* may be mapped to its corresponding one segment of media content second version 130*b*/230*b*/330*b* using comparison data 232 based on the similarity of one or both of audio content and visual content included in each segment.

Comparison data 232 will be described in greater detail for an exemplary implementation in which comparison data 232 is based on visual content included in segments 342*a*, 344*a*, 346*a*, 342*b*, 344*b*, and 346*b*. In that implementation, each video frame of segments 342*a*, 344*a*, 346*a*, 342*b*, 344*b*, and 346*b* may be divided into a 2×2 grid. For each cell of each grid, a simple color descriptor, e.g., an RGB mean, of length 1×3 may be determined. As a result, each video frame of segments 342*a*, 344*a*, 346*a*, 342*b*, 344*b*, and 346*b* can be represented by a feature vector of length 1×12.

Each of video segments 342*a*, 344*a*, 346*a*, 342*b*, 344*b*, and 346*b* can then be represented by the concatenation of the feature vectors of the frames that it contains. In one implementation, the representation of any one segment 342*a*, 344*a*, 346*a*, 342*b*, 344*b*, has 346*b* has dimension twelve times the largest number of video frames contained by any one segment. Those segments having fewer frames can be padded with zeros.

Based on the respective representations of segments 342*a*, 344*a*, 346*a*, 342*b*, 344*b*, and 346*b* described above, a cost matrix enabling the mapping of corresponding segments to one another can be generated. Using the Euclidean distance as a measure of similarity, for example, a segment from among segments 342*a*, 344*a*, and 346*a* may be uniquely mapped to one of segments 342*b*, 344*b*, or 346*b* if their Euclidean distance is zero. Thus, segment 342*a* of media content first version 130*a*/230*a*/330*a* may be mapped to segment 342*b* of media content second version 130*b*/230*b*/330*b*, segment 344*a* may be mapped to segment 344*b*, and segment 346*a* may be mapped to segment 346*b*.

Flowchart 450 continues with aligning each of segments 342*a*, 344*a*, and 346*a* of media content first version 130*a*/230*a*/330*a* with the corresponding one segment of media content second version 130*b*/230*b*/330*b*, i.e., respective segments 342*b*, 344*b*, and 346*b* (action 456). As shown in FIG. 3, although media content first version 130*a*/230*a*/330*a* includes segments in the form of video frames C, D, E, K, L, and M that are omitted from media content second version 130*b*/230*b*/330*b*, segments 342*a*, 344*a*, and 346*a* of media content first version 130*a*/230*a*/330*a* have the same temporal order as respectively corresponding segments 342*b*, 344*b*, and 346*b* of media content second version 130*b*/230*b*/330*b*.

In implementations in which the segments and/or video frames included in media content first version 130*a*/230*a*/330*a* and media content second version 130*b*/230*b*/330*b* have the same temporal order, segments 342*a*, 344*a*, and 346*a*, and respectively corresponding segments 342*b*, 344*b*, and 346*b* may be aligned using a global sequence alignment algorithm. An example of a global sequence alignment algorithm suitable for use in aligning segments 342*a*, 344*a*, and 346*a*, and respectively corresponding segments 342*b*, 344*b*, and 346*b* is the Needleman-Wunsch algorithm utilized in the field of bioinformatics.

The global sequence alignment algorithm may be monotonically increasing, may align two sequences from beginning to end, e.g., media content first version 130*a*/230*a*/330*a* and media content second version 130*b*/230*b*/330*b*, and may align each segment of each sequence only once, e.g., segment 342*a*→segment 342*b*, segment 344*a*→segment 344*b*, and segment 346*a*→segment 346*b*. Thus, in implementations in which the segments and/or video frames included in media content first version 130*a*/230*a*/330*a* and media content second version 130*b*/230*b*/330*b* have the same temporal order, alignment may be performed by transforming between media content first version 130*a*/230*a*/330*a* and media content second version 130*b*/230*b*/330*b* using a combination of simple edits in the form of deletions and insertions.

However, in some implementations, the temporal sequence of the segments and/or video frames of media content second version 130*b*/230*b*/330*b* may be rearranged with respect to the temporal sequence of their respectively corresponding segments and/or video frames of media content first version 130*a*/230*a*/330*a*. In implementations in which the corresponding segments and/or video frames of media content first version 130*a*/230*a*/330*a* and media content second version 130*b*/230*b*/330*b* are subject to translocations or inversions, for example, a semi-global sequence alignment technique may be use to align segments 342*a*, 344*a*, and 346*a*, and respectively corresponding segments 342*b*, 344*b*, and 346*b*.

A semi-global sequence alignment approach is a combination of global and local methods. A local method may be used to determine local similar regions between media content first version 130*a*/230*a*/330*a* and media content second version 130*b*/230*b*/330*b*. Because such a method works locally, it allows for rearrangements. Subsequent to application of the local method, a 1-monotonic conservation map may be generated that identifies the temporal order of the local alignments. Finally, the local alignments may be joined together to create a consistent global alignment.

Whether utilizing a global or semi-global sequence alignment technique, segments 342*a*, 344*a*, and 346*a* of media content first version 130*a*/230*a*/330*a* may be aligned with respectively corresponding segments 342*b*, 344*b*, and 346*b* of media content second version 130*b*/230*b*/330*b* using alignment module 216/316 of software code 110/210, executed by hardware processor 104 of computing platform 102, or by user system hardware processor 124 of user system 120.

In some implementations, flowchart 450 can conclude with utilizing metadata associated with each of at least some of segments 342*a*, 344*a*, and 346*a* of media content first version 130*a*/230*a*/330*a* to annotate respectively corresponding segments 342*b*, 344*b*, and 346*b* of media content second version 130*b*/230*b*/330*b* (action 458). Referring to FIG. 3, action 458 can include utilizing metadata MDA and/or MDB associated with segment 342*a* of media content first version 130*a*/230*a*/330*a* to annotate corresponding segment 342*b* of media content second version 130*b*/230*b*/330*b*.

Analogously, action 458 can include utilizing one or more of metadata MDF, MDG, MDH, MDI, and MDJ associated with segment 344*a* of media content first version 130*a*/230*a*/330*a* to annotate corresponding segment 344*b* of media content second version 130*b*/230*b*/330*b*. Also by way of analogy, action 458 can include utilizing one or more of metadata MDN, MDO, and MDP associated with segment 346*a* of media content first version 130*a*/230*a*/330*a* to annotate corresponding segment 346*b* of media content second version 130*b*/230*b*/330*b*.

As noted above, media content first version 130*a*/230*a*/330*a* may be an original master version of a movie or TV program, while media content second version 130*b*/230*b*/330*b* may be a censored version of the movie or TV program in which some scenes from the original master version are removed. As another example, media content second version 130*b*/230*b*/330*b* may be a broadcast version of TV programming content in which the content included in the original master version of the TV content, i.e., media content first version 130*a*/230*a*/330*a*, is supplemented with advertising content.

In other words, media content first version 130*a*/230*a*/330*a* may be an original master version of media content including metadata, i.e., metadata MDA, MDB, MDF, MDG, MDH, MDI, MDJ, MDN, MDO, and MDP generated by or on behalf of an owner or creator of media content first version 130*a*/230*a*/330*a*. Segments 342*b*, 344*b*, and 346*b* of media content second version 130*b*/230*b*/330*b* may be annotated utilizing one or more of metadata MDA, MDB, MDF, MDG, MDH, MDI, MDJ, MDN, MDO, and MDP by annotation module 218 of software code 110/210, executed by hardware processor 104 of computing platform 102, or by user system hardware processor 124 of user system 120.

It is noted that, in some implementations, actions 454, 456, and 458 of flowchart 450 can be repeated to annotate media content second version 130*b*/230*b*/330*b* at a finer level of granularity, provided the finer or smaller segments of media content first version 130*a*/230*a*/330*a* are included in segments 342*a*, 344*a*, and 346*a* and were subject to analysis by analysis module 212 during the previous iteration. For example, in a first iteration of actions 454, 456, and 458, metadata associated with a segment of media content first version 130*a*/230*a*/330*a*, such as metadata associated with frames included in a shot of video, may be utilized to annotate a corresponding shot of video of media content second version 130*b*/230*b*/330*b*. However, in a second iteration of actions 454, 456, and 458, metadata associated with an individual video frame of one of segments 342*a*, 344*a*, and 346*a* of media content first version 130*a*/230*a*/330*a* may be utilized to annotate a corresponding video frame of media content second version 130b/230b/330b.

Thus, in some implementations, hardware processor 104 of computing platform 102 or user system hardware processor 124 of user system 120 may further execute software code 110/210 to use mapping module 214 to map one or more of video frames A through P of media content first version 130a/230a/330a to a corresponding one video frame of media content second version 130b/230b/330b. According to implementations of the present inventive principles, and as shown in FIG. 3, comparison data 232 generated by analysis module 212 and used in a first iteration of action 454 can advantageously be reused by mapping module 214 to map one or more of video frames A through P of media content first version 130a/230a/330a to a corresponding one video frame of media content second version 130b/230b/330b. That is to say video frames of media content first version 130a/230a/330a may be mapped to respectively corresponding video frames of media content second version 130b/230b/330b through reuse of comparison data 232, based on the similarity of one or both of audio content and visual content included in each video frame.

Hardware processor 104 of computing platform 102 or user system hardware processor 124 of user system 120 may also further execute software code 110/210 to use alignment module 216/316 to align video frames of media content first version 130a/230a/330a with respectively corresponding video frames of media content second version 130b/230b/330b. Hardware processor 104 of computing platform 102 or user system hardware processor 124 of user system 120 may then execute software code 110/210 to use annotation module 218 to utilize metadata associated with one or more video frames of media content first version 130a/230a/330a to annotate the respectively corresponding video frames of media content second version 130b/230b/330b.

Furthermore, in some implementations, hardware processor 104 of computing platform 102 or user system hardware processor 124 of user system 120 may further execute software code 110/210 to utilize metadata associated with segments, such as shots of video, or associated with individual video frames of media content second version 130b/230b/330b, to annotate respectively corresponding segments or video frames of media content first version 130a/230a/330a. Consequently, in some implementations, metadata associated with segments and/or video frames of each of media content first version 130a/230a/330a and media content second version 130b/230b/330b can be utilized to annotate respectively corresponding segments and/or video frames of the other of media content first version 130a/230a/330a and media content second version 130b/230b/330b.

As noted above, in some implementations, media content second version 130b/230b/330b may be a broadcast version of TV programming content for which media content first version 130a/230a/330a is a master version. In those implementations, metadata associated with segments and/or video frames of media content second version 130b/230b/330b and utilized to annotate respectively corresponding segments and/or video frames of media content first version 130a/230a/330a may be based on viewer or consumer response to broadcast of media content second version 130b/230b/330b. For example, such metadata may include broadcast ratings or viewer generated tags applied to media content second version 130b/230b/330b.

Although not included in flowchart 450, in some implementations, the present method can further include rendering annotated media content 130c/230c/330c, on a display, such as display 108 or display 128 of user system 120. The rendering of annotated media content 130c/230c/330c on display 108 or display 128 may be performed by software code 110/210, executed respectively by hardware processor 104 of computing platform 102 or by user system hardware processor 124.

It is emphasized that the method presented by flowchart 450, as well as the subsequent optional one or more iterations of actions 454, 456, and 458 can be used to automate the propagation of annotations between versions of media content. As a result, the present inventive concepts advantageously enable a human editor, such as user 140, to annotate a master version of media content once, and have other versions of that same core media content accurately populated with the annotations automatically.

Thus, the present application discloses a media content annotation solution. The present solution includes mapping each of multiple segments of a first version of media content to a corresponding one segment of a second version of the media content. Mapping segments between the first and second versions of the media content enables alignment of each video segment in the first version with its corresponding segment in the second version. As a result, metadata associated with a segment of the first version of the media content may be used to annotate its corresponding segment of the second version of the media content, and vice versa, thereby providing an accurate and efficient solution for mapping metadata annotations among versions of the same core media content. Moreover, the present solution further advantageously enables performance of the disclosed media content metadata mapping as an automated process.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A media content annotation system comprising:
   a computing platform including a hardware processor and a system memory;
   a software code stored in the system memory;
   the hardware processor configured to execute the software code to:
   receive a first version of a media content and a second version of the media content, wherein the second version of the media content is created by altering the first version of the media content;
   map each of a plurality of first video shots of the first version of the media content to a corresponding one of a plurality of second video shots of the second version of the media content based on determining shot visual feature similarities between first video shot features of the plurality of first video shots and second video shot features of the corresponding one of the plurality of second video shots;
   align, based on mapping the plurality of first video shots, each of the plurality of first video shots of the first version of the media content with the corresponding one of the plurality of second video shots of the second version of the media content, wherein each of the plurality of first video shots includes a plurality of first video frames, and each of the plurality of second video shots includes a plurality of second video frames;

after aligning each of the plurality of first video shots with the corresponding one of the plurality of second video shots, for each pair of the aligned one of the plurality of first video shots and the corresponding one of the plurality of second video shots:

map each of the plurality of first video frames to a corresponding one of the plurality of second video frames based on determining frame visual feature similarities between first video frame features of the plurality of first video frames and second video frame features of the corresponding one of the plurality of second video frames;

align, based on mapping the plurality of first video frames, each of the plurality of first video frames with the corresponding one of the plurality of second video frames; and utilize metadata associated with a subset of the plurality of first video shots or a subset of the plurality of first video frames of the first version of the media content, to annotate the respective corresponding one of the plurality of second video shots or the plurality of second video frames of the second version of the media content.

2. The media content annotation system of claim 1, wherein each of the plurality of first video shots of the first version of the media content and the corresponding one of the plurality of second video shots of the second version of the media content have a same temporal sequence.

3. The media content annotation system of claim 1, wherein a temporal sequence of the plurality of second video shots of the second version of the media content is rearranged with respect to a temporal sequence of the plurality of first video shots of the first version of the media content.

4. The media content annotation system of claim 1, wherein the hardware processor is further configured to execute the software code to utilize another metadata associated with each respective corresponding one of the plurality of second video shots or the plurality of second video frames of the second version of the media content, to annotate the subset of the plurality of first video shots or the subset of the plurality of first video frames of the first version of the media content.

5. The media content annotation system of claim 4, wherein the another metadata is generated based on a viewer response to the second version of the media content.

6. A method for use by a media content annotation system including a computing platform having a hardware processor and a system memory storing a software code, the method comprising:

receiving, using the hardware processor, a first version of a media content and a second version of the media content, wherein the second version of the media content is created by altering the first version of the media content;

mapping, using the hardware processor, each of a plurality of first video shots of the first version of the media content to a corresponding one of a plurality of second video shots of the second version of the media content based on determining shot visual feature similarities between first video shot features of the plurality of first video shots and second video shot features of the corresponding one of the plurality of second video shots;

aligning, using the hardware processor and based on mapping the plurality of first video shots, each of the plurality of first video shots of the first version of the media content with the corresponding one of the plurality of second video shots of the second version of the media content, wherein each of the plurality of first video shots includes a plurality of first video frames, and each of the plurality of second video shots includes a plurality of second video frames;

after aligning each of the plurality of first video shots with the corresponding one of the plurality of second video shots, for each pair of the aligned one of the plurality of first video shots and the corresponding one of the plurality of second video shots:

mapping, using the hardware processor, each of the plurality of first video frames to a corresponding one of the plurality of second video frames based on determining frame visual feature similarities between first video frame features of the plurality of first video frames and second video frame features of the corresponding one of the plurality of second video frames;

aligning, using the hardware processor and based on mapping the plurality of first video frames, each of the plurality of first video frames with the corresponding one of the plurality of second video frames; and utilizing, using the hardware processor, metadata associated with a subset of the plurality of first video shots or a subset of the plurality of first video frames of the first version of the media content, to annotate the respective corresponding one of the plurality of second video shots or the plurality of second video frames of the second version of the media content.

7. The method of claim 6, wherein each of the plurality of first video shots of the first version of the media content and the corresponding one of the plurality of second video shots of the second version of the media content have a same temporal sequence.

8. The method of claim 6, wherein a temporal sequence of the plurality of second video shots of the second version of the media content is rearranged with respect to a temporal sequence of the plurality of first video shots of the first version of the media content.

9. The method of claim 6, further comprising utilizing another metadata associated with each respective corresponding one of the plurality of second video shots or the plurality of second video frames of the second version of the media content, to annotate the subset of the plurality of first video shots or the subset of the plurality of first video frames of the first version of the media content.

10. The method of claim 6, wherein the another metadata is generated based on a viewer response to the second version of the media content.

11. The media content annotation system of claim 1, wherein a first total number of the plurality of first video shots in the first version of the media content is greater than a second total number of the plurality of second video shots in the second version of the media content.

12. The media content annotation system of claim 1, wherein a first total number of the plurality of first video shots in the first version of the media content is less than a second total number of the plurality of second video shots in the second version of the media content.

13. The method of claim 6, wherein a first total number of the plurality of first video shots in the first version of the media content is greater than a second total number of the plurality of second video shots in the second version of the media content.

14. The method of claim 6, wherein a first total number of the plurality of first video shots in the first version of the media content is less than a second total number of the plurality of second video shots in the second version of the media content.

15. The media content annotation system of claim 1, wherein the first video shot features include first visual features of the first version of the media content, and the second video shot features include second visual features of the second version of the media content, and wherein the hardware processor is further configured to execute the software code to utilize a cost matrix to determine the shot visual feature similarities based on the first visual features and the second visual features.

16. The media content annotation system of claim 1, wherein each of the first video shot features is represented by a corresponding one of a first plurality of feature vectors, wherein each of the second video shot features is represented by a corresponding one of a second plurality of feature vectors, and wherein the hardware processor is further configured to execute the software code to utilize a cost matrix to determine the shot visual feature similarities based on the first plurality of feature vectors and the second plurality of feature vectors.

17. The method of claim 6, wherein the first video shot features include first visual features of the first version of the media content, and the second video shot features include second visual features of the second version of the media content, and wherein the method further comprises utilizing a cost matrix to determine the shot visual feature similarities based on the first visual features and the second visual features.

18. The method of claim 6, wherein each of the first video shot features is represented by a corresponding one of a first plurality of feature vectors, wherein each of the second video shot features is represented by a corresponding one of a second plurality of feature vectors, and wherein the method further comprises utilizing a cost matrix to determine the shot visual feature similarities based on the first plurality of feature vectors and the second plurality of feature vectors.

\* \* \* \* \*